United States Patent
Lechner

[19]

[11] Patent Number: 6,150,746
[45] Date of Patent: Nov. 21, 2000

[54] SYNCHRONOUS ELECTRICAL MACHINE WITH U-SHAPED NON-MAGNETIC HOLDER FOR PERMANENT MAGNETS

[75] Inventor: Juergen Lechner, Eberdingen-Nussdorf, Germany

[73] Assignee: Robert Bosch GmbH, Stuttgart, Germany

[21] Appl. No.: 09/235,533

[22] Filed: Jan. 22, 1999

[30] Foreign Application Priority Data

Jan. 26, 1998 [DE] Germany .............. 198 02 786

[51] Int. Cl.$^7$ .......................... H02K 21/04; H02K 19/22
[52] U.S. Cl. .......................... 310/181; 310/263
[58] Field of Search .................... 310/263, 181

[56] References Cited

U.S. PATENT DOCUMENTS

| | | | |
|---|---|---|---|
| 5,306,977 | 4/1994 | Hayashi ...................... | 310/263 |
| 5,578,885 | 11/1996 | Alford et al. ................. | 310/263 |
| 5,747,913 | 5/1998 | Amlee et al. ................. | 310/263 |
| 5,907,209 | 5/1999 | Ishida ......................... | 310/263 |
| 5,969,459 | 10/1999 | Taniguchi et al. ............. | 310/263 |

FOREIGN PATENT DOCUMENTS

| | | | |
|---|---|---|---|
| 8905353 U | 4/1990 | Germany . | |
| 5-056616A | 3/1993 | Japan .......................... | 310/263 |
| 10-004660A | 1/1998 | Japan .......................... | 310/263 |

*Primary Examiner*—Nick Ponomarenko
*Assistant Examiner*—Karl E. Imayoshi Tamai
*Attorney, Agent, or Firm*—Michael J. Striker

[57] ABSTRACT

A synchronous machine, in particular a motor for a motor vehicle has an excitation system composed of a plurality of electrically excited individual poles in a stator or a rotor, preferably formed as claw poles excited by at least one joint excitation coil, wherein for compensation of a magnetic stray flux in the intermediate spaces between the mutually oriented and alternatingly nested claw poles, the permanent magnets are inserted on the pole plates on the ends of the stator or rotor, so as to facilitate and simplify the insertion of the permanent magnets required for compensation of the stray flux and to improve their compensation action.

38 Claims, 5 Drawing Sheets

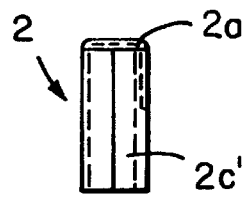
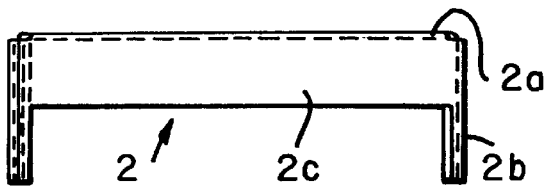
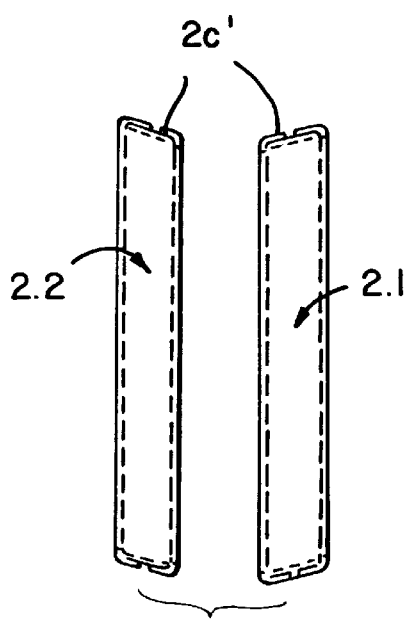
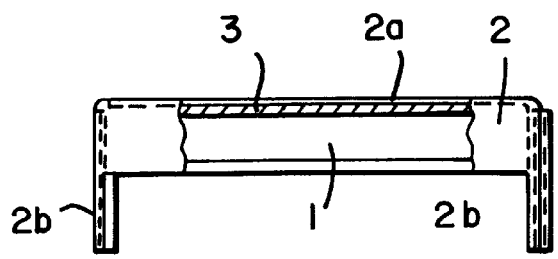
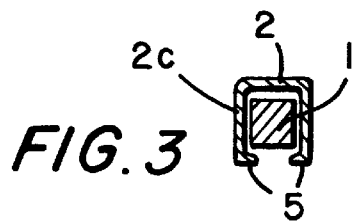
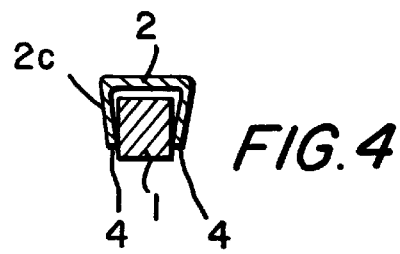

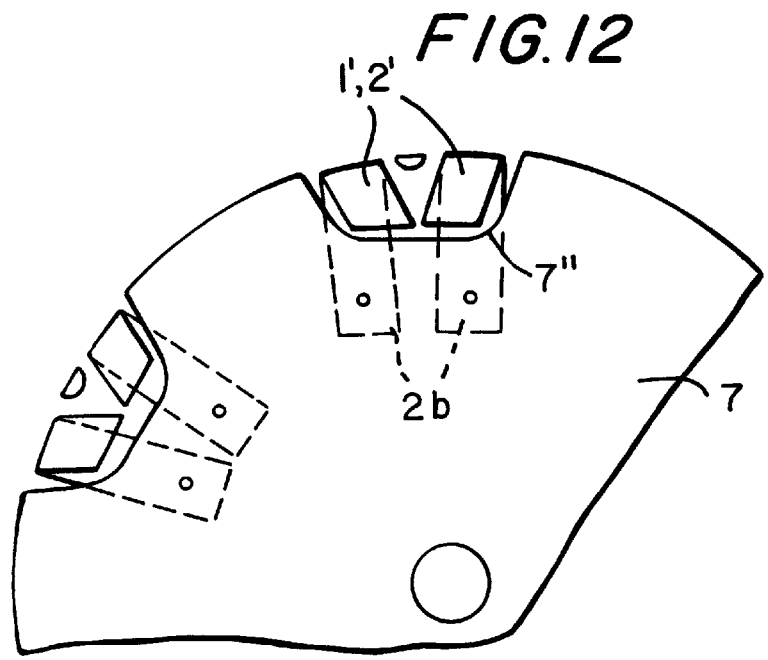
FIG.12
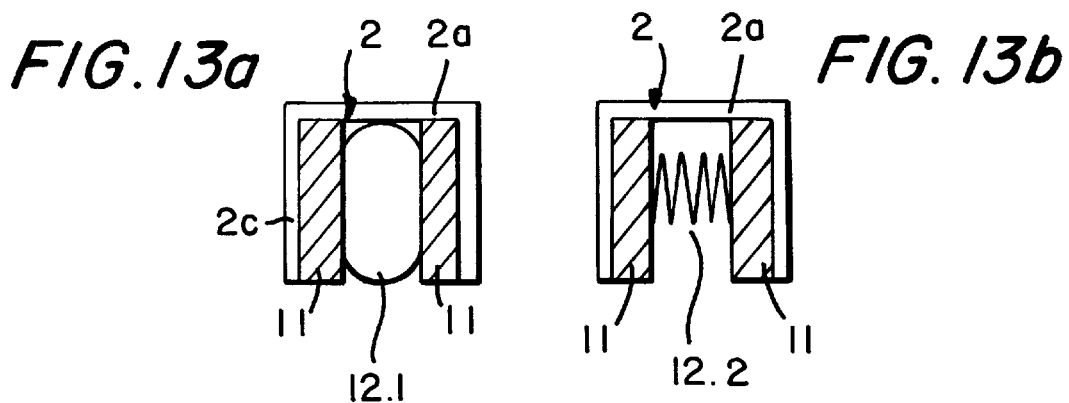
FIG.13a  FIG.13b
FIG.14

SYNCHRONOUS ELECTRICAL MACHINE WITH U-SHAPED NON-MAGNETIC HOLDER FOR PERMANENT MAGNETS

BACKGROUND OF THE INVENTION

The present invention relates to a synchronous machine, in particular a generator or a motor for a motor vehicle.

In particular, it relates to a synchronous machine which has an excitation system with a plurality of electrically excited individual poles in the stator or rotor, preferably in form of claw poles which are excited by at least one common excitation coil, wherein for compensation of the magnetic stray flux, permanent magnets are arranged in the free spaces between the claw poles which are oriented toward one another and alternatingly nested in one another, on the pole plates arranged on the ends of the stator or rotor.

Such a synchronous machine is disclosed for example in the German patent document DE 89 05 353. The permanent magnets which are located in the free spaces between the claw poles of a rotor are magnetized tangentially so that they compensate the stray flux between the neighboring claw poles and so that the power of the synchronous machine is increased. The permanent magnets are supported radially on the non-magnetic holding plates, which are inserted and fixed in the peripheral, substantially axially extending recesses, while the permanent magnets are placed on the facing side of the neighboring claw poles.

In this known synchronous machine, the insertion of the permanent magnets requires a substantial mounting expense and moreover the permanent magnets are not sufficiently fixed in the axial direction of the rotor. Also, the claw poles with their recesses for the holding plates have a complicated construction.

SUMMARY OF THE INVENTION

Accordingly, it is an object of the present invention to provide a synchronous machine of the above mentioned general type which is simpler than the existing machines.

More particularly, it is an object of the present invention to provide a synchronous machine of the above mentioned type, in which the permanent magnets are reliably held radially and axially, and can be inserted in a prefabricated rotor to be supported against centrifugal forces.

In keeping with these objects and with others which will become apparent hereinafter, one feature of present invention resides, briefly stated, in a synchronous machine in which the permanent magnets are inserted in a non-magnetic holder having a U-shaped cross-section with a base leg radially supporting the permanent magnets against centrifugal forces, with the axial ends of the holder are closed and connected with the pole plates, wherein non-magnetic holding discs are connected to the pole plates in order to fix the permanent magnets axially, and also two U-shaped holders are inserted per each free space and arranged axially one behind the other so that they support with their base legs two permanent magnets against the centrifugal forces, the axial, facing away ends of both holders are closed when connected with the pole plates or non-magnetic holding discs connected to the plates, and the facing ends of both holders are closed and connected with one another to axially fix two permanent magnets per each free space.

The holders alone or with the axially arranged closing disc form a receptacle for a bar-shaped permanent magnet which is closed at five sides, wherein the base leg of the holder is arranged so that in the case of a rotor it can absorb the occurring centrifugal forces. The permanent magnets inserted in the rotor are loaded only with the pressure. Since the pressure strength of hard ferrites and SE magnets are substantially higher than the pulling strength, the permanent magnets which are produced simply and inexpensively can be utilized with simple standard shape. The design is such that the permanent magnets in their cross-section correspond to the cross-section of the receptacle of the holders and extend to the closed end of the holders.

The receptacle for the permanent magnets of a holder is closed in a simple manner at the end, so that at the axial end of the holder, tongues are bent on the base leg or the side leg which close the holder and are connected with the outer sides of the pole plates. Or the holder at the axial end of the base leg, carries elongated tongues which are connected with edge-mounted tongues of the holding discs.

The closing discs can be connected with the pole plates. On the other hand, they can also be connected with the shaft of the rotor.

During the utilization of the holding discs for mounting of the holders, the construction can be formed so that ventilation vanes can be projected and bent on the holding discs.

The permanent magnets can be fixed in the holders by adhesive, casting, force-transmitting or form-locking connection. Then the holder and the permanent magnet form a prefabricated unit which can be radially inserted in a free space between the claw poles. The tongues must be only connected with the pole plates, for example by welding.

For this purpose in accordance with a further embodiment of the present invention, it is provided that the holders and the holding discs are composed of non-magnet weldable material, such as high grade steel, brass, bronze or aluminum.

The selected form of the holders provides for the possibility of an especially simple manufacture and insertion of the permanent magnet, when the permanent magnets are composed of magnetizable casting mass which fills the holder and after their hardening they are magnetized for the insertion of the holder of the free spaces between the claw poles.

In accordance with a further embodiment, the mirror symmetrical, reduced holders in the machine with oppositely directed and peripherally alternatingly arranged claw poles, are inserted into free spaces which are differently inclined toward the central axis of the machine. Their tongues correspond to the different inclinations of the free spaces to the longitudinal axis of the holder. Thereby the critical cross-section in the root region of the claw poles is increased.

With the permanent magnets distributed in the axial direction per each free space, it is possible in accordance with a further embodiment of the present invention to connect the facing ends of the holder inserted in a free space with a tooth of a non-magnetic tooth ring.

In accordance with still another embodiment of the present invention, in order to absorb the centrifugal forces, the toothed ring is formed with outer teeth and surrounds the excitation coil of the rotor.

When the teeth of the toothed ring extend over the width of the holder, the holder can be welded directly to the teeth of the toothed ring. With the holders extending axially from one pole plate to the other pole plate, the stability against centrifugal forces can be further increased when a toothed gear in a center of the holder engages with a tooth in its receptacle, and they are separated into two partial receptacles for two permanent magnets per one free space.

In order to reduce the cost, it is proposed that the holder receives two permanent magnets which abut against the side legs and cover less than half cross-section of the receptacle, and the intermediate space between both permanent magnets is filled with elastic mass or springs. This requires less magnetic material per one free space and moreover, reduces the weight, which results in reduced centrifugal forces.

In accordance with a further embodiment of the present invention, with the distributed permanent magnets per one free space, the both U-shaped holders per free space are welded to one tooth of a tooth ring, and with their side legs correspond in their inclination to the shape of the transition from the facing pole plate to the claw poles, to increase the efficiency of the stray field compensation.

Due to the shortening of the holders of the permanent magnets, in addition the cross-section in the critical narrow location at the root of the claw pole is increased.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a holder extending from one pole plate to another pole plate and connectable with it, of a synchronous machine in accordance with the present invention;

FIG. 1a is a view at the end side of the holder of the inventive synchronous machine;

FIG. 1b is a view showing a pair of holders similar to that of FIG. 1 for the synchronous machine, in which the free spaces extend not parallel to a central axis of a machine and are inclined relative to one another;

FIG. 2 is a view showing fixing of the permanent magnets in the holder of FIG. 1 by adhesive connection;

FIG. 3 is a view showing fixing the permanent magnets in the holder by form locking.

FIG. 4 is a view showing fixing of the permanent magnets in the holder by a force-transmitting connection;

FIG. 12 is a partial view of reduced semi-holders per each free space of the inventive machine;

FIG. 13 is a view showing a subdivision of the permanent magnets into two permanent magnets having a smaller cross-section;

FIG. 14 is a view of the holder with the tongues bent from the base leg.

DESCRIPTION OF PREFERRED EMBODIMENTS

The present invention is illustrated by an example of a synchronous machine with an inner rotor. However, it can be used of course for a synchronous machine with an outer rotor. The same is true for the construction of corresponding stators.

Figure 5:
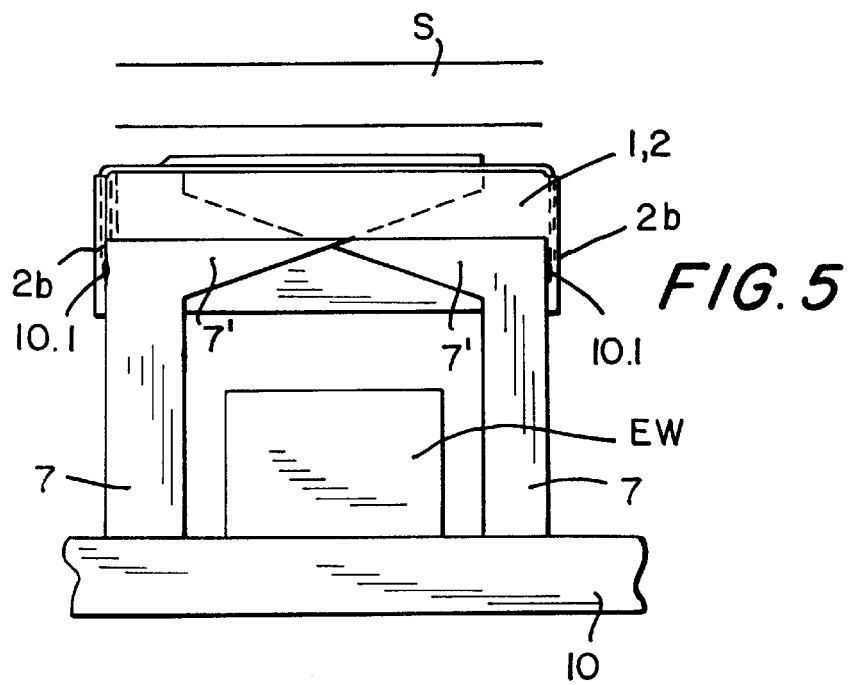
FIG. 5 is a view schematically showing fixing of a holder to both plates of the rotor of the inventive machine.

The synchronous machine has a holder 2 which has a U-shaped cross-section as shown in FIG. 1. It includes a base leg 2a and side legs 2c. The ends of the holder 2 are closed with tongues 2b which are spaced from one another by a distance corresponding to the outer dimension of both pole plate 7 of the rotor as shown in FIG. 5. The tongues 2b can be bent on the base leg 2a or on the side legs 2c of the holder 2 as shown in FIG. 1a. In addition, the tongues 2b can close a recess closed by the holder 2 at five sides, inclined to a longitudinal direction. The free spaces between the claw poles 7' are not parallel to the central axis of the machine. In the shown embodiment they extend to the shaft 10 of the rotor and in addition are alternatingly inclined relative to one another. Then a pair of mirror-symmetrically designed holders 2.1 and 2.2 are required, as shown in FIG. 1b.

The tongues 2b bent from the side legs 2c' extend after the insertion in the free space between the claw poles 6, so that the tongues 2b are oriented parallel with the outer sides of the pole plates 7 and can be welded with them, as shown by welding points 10.1 in FIG. 5. The permanent magnet 1 has a cross-section corresponding to the cross-section of the receptacle of the holder 2 and extends to the tongues 2b, in other words over the whole length of the rotor. As shown in FIG. 2, the permanent magnet 1 can be glued by an adhesive layer 3 in the receptacle of the holder 2. As shown in FIG. 3, the ends of the side legs 2c can be bent. The undercut produced thereby makes possible a form-locking holding of the permanent magnet 1. The ends 5 can be also formed as mortised-in parts of the side legs 2c of the holder 2. The permanent magnet 1 is then form-lockingly fixed in the holder 2. The force-transmitting connection can be obtained by a corresponding press fit through the side legs 2c, as shown by pressing points 4 in FIG. 4.

Figure 6:
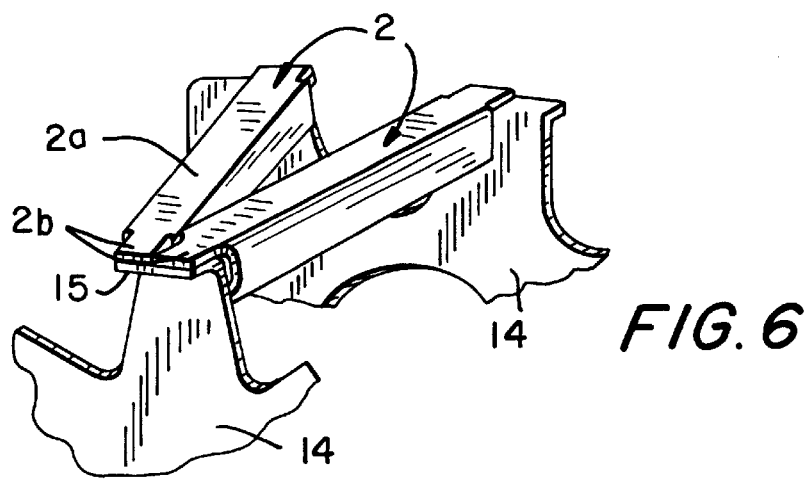
FIG. 6 is a view showing a partial perspective of the fixation of the two holders of neighboring free spaces on axially arranged holding plate discs.

FIG. 6 shows two axially arranged, non-magnetic holding discs 14 which in the case of an inner rotor of a synchronous machine are welded to the pole plates 7 and connected with them or the shaft 10 of the rotor, for example by welding. For this purpose, the holding discs 14 are composed of non-magnetic weldable material, such as high grade steel, brass, bronze or aluminum. The holders 2 are provided with elongated tongues 2b at both axial ends of the base leg 2a. The tongues are welded with outwardly bent mounting tongues 15 of the holding discs 14. Since the inclination of the holders changes alternatingly, the mounting tongues 15 are so wide that each of the both holders 10 can be mounted, so as to extend from the tip of the narrowing claw pole 7' and to surround this claw pole.

Figure 7:
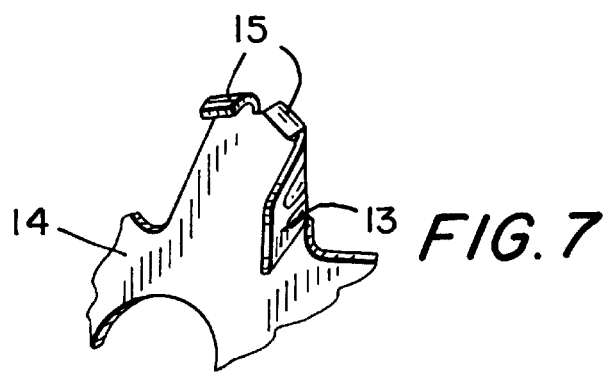
FIG. 7 is a partial perspective view of a holding disc with bent ventilator vanes of the inventive machine.

As shown in FIG. 7 the holding discs 14 can be bent near the mounting tongues 15 to form projecting ventilation vanes 13.

Figure 8:
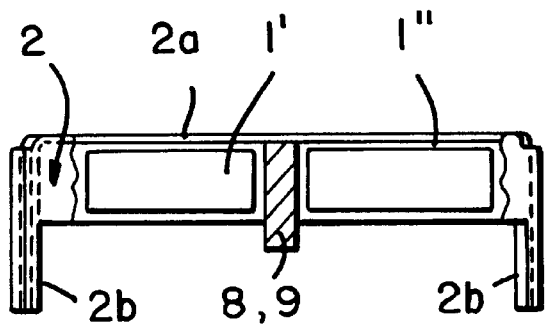
FIG. 8 is a view showing a holder of FIG. 1 with axially subdivided permanent magnets of the inventive machine.
Figure 9:
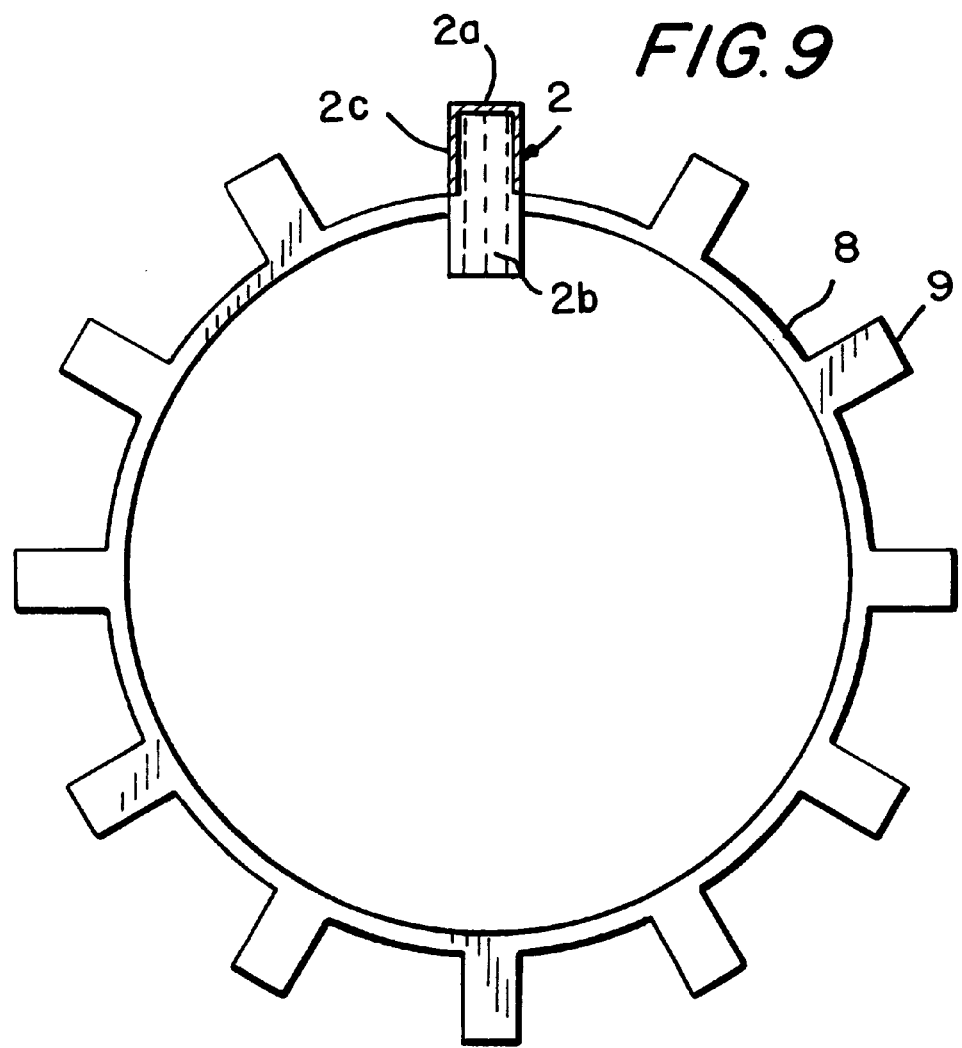
FIG. 9 is view showing a toothed ring with teeth engaging in a receptacle of the holder of FIG. 1, and with both permanent magnets axially fixed per each free space.
Figure 10:
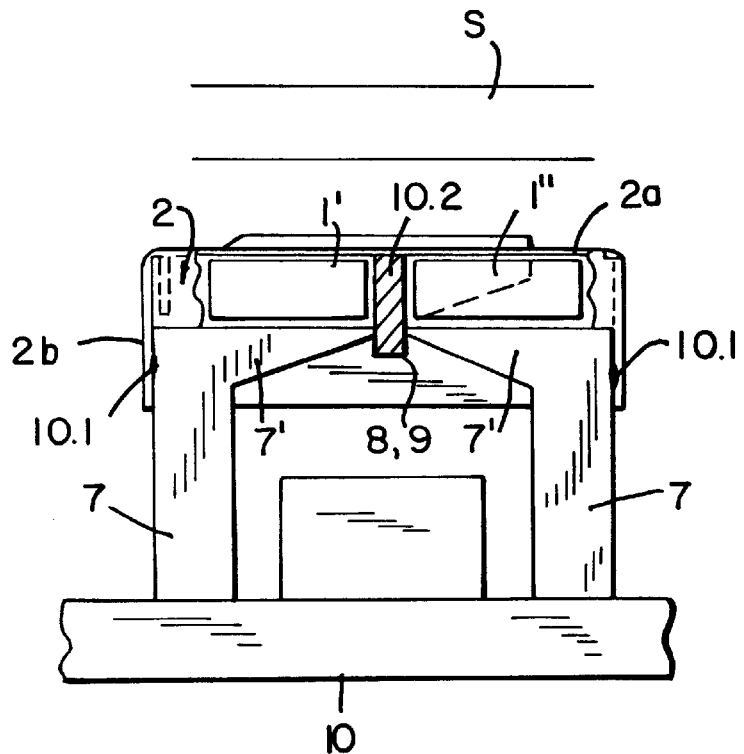
FIG. 10 is a view showing a tooth ring connected with the holders and mounted on a rotor of the inventive machine.

As shown in FIGS. 8–10, the holders can be additionally connected centrally to form a fixed unit. For this purpose a toothed ring 8 is provided, whose teeth 9 form outer teeth and are inserted in the receptacles of the holders 2. The welding points 10.1 connect the tongues 2b of the holder 2 with the outer side of the pole plate 7. Moreover, the teeth 9 of the tooth ring are welded with the base leg 2*a* of the holder 2, as shown by the welding point 10.2 in FIG. 10. The permanent magnet surrounds two identical parts 1' and 1" which are supported in the subdivided receptacles of the holder 2 radially against centrifugal forces and secured axially against axial impact forces. The tongues 2*b* of the holder 2 can be bent on the base leg 2*a* or the side legs 2*c* of the holder 2.

Figure 11:
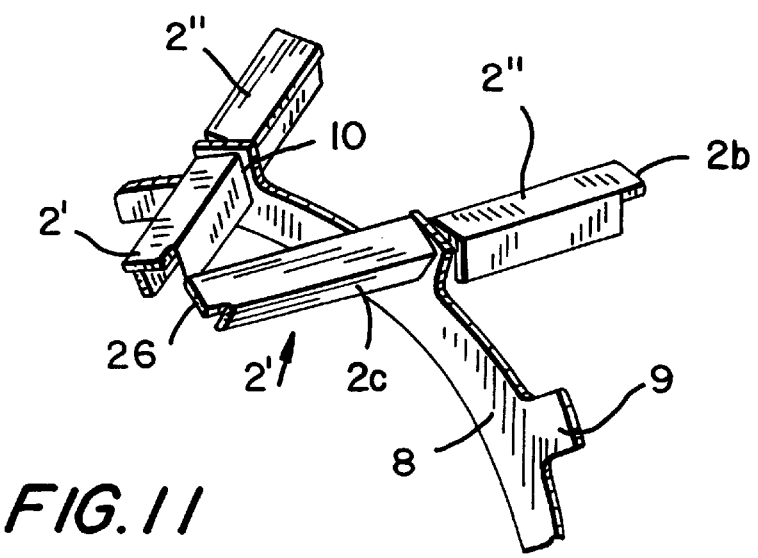
FIG. 11 is a view showing a distribution of holders per free space and a connection of both reduced semi holders to a toothed ring.

As shown in FIG. 11, the width of the teeth 9 corresponds to the width of the receptacle of the holder 2. The teeth 9 fill the receptacles of the holder 2 and form non-magnetic separating walls between the partial receptacles.

When a toothed ring 8 is utilized, then the holder 2 can be subdivided into the semi-holders 2' and 2" as shown in FIG. 11. The facing semi-holders 2' and 2" are closed and connected with a tooth 9 of the tooth ring 8, for example by welding, when it is composed of a non-magnetic weldable material, such as high grade steel, brass, bronze or aluminum. As can be seen from FIG. 11, both semi-holders 2' and 2" are shortened relative to one another, so that the inclination of the side legs 2*c* corresponds to the transition 7" between the facing pole plate 7 and the formed claw pole 7', as shown in FIG. 12. This provides an improvement of the stray flux compensation on weakened root region of the claw pole 7'. The tongues 2*b* of two semi-holders 2' and 2" are welded to the mounting flanges 15 of the holding discs 14, and they surround the facing tips of the claw pole 7'. The view on the pole plate 7 of FIG. 12 repeats itself at the other end of the rotor. The semi-holders 2" of the abutting free spaces on the other pole plate 7 are designed in correspondence with the transition 7" in their inclination of the side legs 2*c*. The tongues 2*b* of the semi-holders 2' and 2" are welded with the pole plates 7 or closing plates 14.

The permanent magnets inserted in the holder 2 can have a smaller cross-section than the receptacle of the U-shaped holder 2 as shown in FIG. 13. In this embodiment two permanent magnets 11 are inserted in a receptacle of the holder 2, which abut against the side legs 2*c*. The intermediate space is filled with an elastic filling material 2.1 or springs 12.2 which hold the permanent magnet 11 to abut against the side legs 2*c* of the holder. With this device the magnetic material can be saved and the centrifugal forces are reduced due to the weight reduction. The two-part design of the permanent magnets are also used with the holders 2 in FIGS. 8–10.

The present invention can be used advantageously for outer rotors. However, it should be mentioned that the holders are designed so that their base legs 2*a* absorb the centrifugal forces.

It will be understood that each of the elements described above, or two or more together, may also find a useful application in other types of constructions differing from the types described above.

While the invention has been illustrated and described as embodied in synchronous machine, in particular generator or motor for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A synchronous machine formed as a generator for a motor vehicle, comprising a stator; a rotor, an excitation system including a plurality of electrically excited individual poles in said rotor and formed as claw poles excited by at least one common excitation coil; pole plates arranged on ends of said rotor; permanent magnets provided for compensation of a magnetic stray flux and inserted in free spaces between said claw poles which are directed oppositely to one another and are alternatingly nested in one another; a U-shaped non-magnetic holder in which said permanent magnets are inserted, said holder having a base leg which radially supports said permanent magnets against centrifugal forces, said holder having tongues bent on the holder, said holder having closed axial ends, said axial ends being closed by said tongues, said tongues of said holder being directly connected with elements selected from the group consisting of said poles plates and holding discs connected to said pole plates so as to axially fix said permanent magnets.

2. A synchronous machine as defined in claim 1, wherein said axial ends of said holder are provided with said tongues which are connected with outer sides of said pole plates.

3. A synchronous machine as defined in claim 2, wherein said tongues are bent on said base leg.

4. A synchronous machine as defined in claim 2, wherein said tongues are bent on side legs of said holder.

5. A synchronous machine as defined in claim 1, wherein said base leg of said holder is provided with elongated tongues; and further comprising holding discs provided with bent mounting tongues which are connected with said tongues of said base leg.

6. A synchronous machine as defined in claim 5, wherein said holding discs are connected with said pole plates.

7. A synchronous machine as defined in claim 5, wherein said rotor has a shaft, said holding disc being connected with said shaft.

8. A synchronous machine as defined in claim 5, wherein said holding discs are provided with ventilating vanes.

9. A synchronous machine as defined in claim 1, wherein said holder has a receptacle, said permanent magnets having a cross-section corresponding to a cross-section of said receptacle and extending to closed ends of said holder.

10. A synchronous machine as defined in claim 1; and further comprising means for fixing said permanent magnets and said holder and including fixing means selected from the group consisting of adhesive means, casting means, force-transmitting means and form-locking means.

11. A synchronous machine as defined in claim 1, wherein said permanent magnets are composed of a magnetizable casting mass which fills said holder and after its hardening is magnetized before insertion of said holder into the free spaces between said claw poles.

12. A synchronous machine as defined in claim 5, wherein said holder and said holding discs are composed of non-ferromagnetic weldable material selected from the group consisting of high grade steel, brass, bronze and aluminum.

13. A synchronous machine as defined in claim 1, wherein said free spaces are differently inclined relative to an axis of said machine, said holders being mirror-symmetrical relative to their longitudinal axis, shortened and inserted in said differently inclined free spaces, said tongues being formed to correspond to different inclinations of said free spaces.

14. A synchronous machine as defined in claim 1; and further comprising a toothed ring having a tooth which engages in a center of said holder in a receptacle and subdivides said receptacle into two partial receptacles for two of said permanent magnets per each of said free spaces.

15. A synchronous machine as defined in claim 1, wherein said holder receives two said permanent magnets which abut against side legs of said holder and cover at least a half cross-section of a receptacle of said holder; and further comprising means for filling an intermediate space between said two permanent magnets.

16. A synchronous machine as defined in claim 15, wherein said means for filling is an elastic mass.

17. A synchronous machine as defined in claim 15, wherein said means for filling are springs.

18. A synchronous machine formed as a generator for a motor vehicle, comprising a stator; a rotor; an excitation system having a plurality of electrically excited individual poles in said rotor, formed by claw poles which are excited by at least one common excitation coil; pole plates arranged on ends of said rotor; permanent magnets provided for compensation of a magnetic stray flux in free spaces between said claw poles; two U-shaped non-magnetic holders inserted in each of the free spaces, said holders are arranged one behind the other in an axial direction and having base legs supporting two of said permanent magnets against centrifugal forces, said holder having axial ends which face away from one another and are closed, said holder being provided with tongues at the ends which face away from one another, said tongues of said holders being directly connected with elements selected from the group consisting of said pole plates and holding discs connected to said pole plates so as to axially fix said permanent magnets, said holders having facing ends which are closed and connected with one another so as to axially fix two of said permanent magnets per each of the free spaces.

19. A synchronous machine as defined in claim 18, wherein said axial ends of said holders are provided with said tongues which are connected with outer sides of said pole plates.

20. A synchronous machine as defined in claim 18, wherein said tongues are bent on said base leg.

21. A synchronous machine as defined in claim 18, wherein said tongues are bent on side legs of said holder.

22. A synchronous machine as defined in claim 18, wherein said base leg of said holders is provided with elongated tongues; and further comprising holding discs provided with bent mounting tongues which are connected with said tongues of said base leg.

23. A synchronous machine as defined in claim 18, wherein said holding discs are connected with said pole plates.

24. A synchronous machine as defined in claim 18, wherein said rotor has a shaft, said holding discs being connected with said shaft.

25. A synchronous machine as defined in claim 18, wherein said holding discs are provided with ventilating vanes.

26. A synchronous machine as defined in claim 18, wherein said holders have a receptacle, said permanent magnets having a cross-section corresponding to a cross-section of said receptacle and extending to closed ends of said holders.

27. A synchronous machine as defined in claim 18; and further comprising means for fixing said permanent magnets and said holders and including fixing means selected from the group consisting of adhesive means, casting means, force-transmitting means and form-locking means.

28. A synchronous machine as defined in claim 18, wherein said permanent magnets are composed of a magnetizable casting mass which fills said holders and after its hardening is magnetized before insertion of said holders into the free spaces between said claw poles.

29. A synchronous machine as defined in claim 18; and further comprising means for fixing said permanent magnets and said holders and including fixing means selected from the group consisting of adhesive means, casting means, force-transmitting means and form-locking means.

30. A synchronous machine as defined in claim 18; and further comprising a non-magnetic toothed ring having a tooth which connects facing ends of said holders inserted in the free space.

31. A synchronous machine as defined in claim 30, wherein said toothed ring has outer teeth and surrounds said excitation coil of said rotor which is formed as an inner rotor.

32. A synchronous machine as defined in claim 30, wherein said teeth of said toothed ring extend over a width of said holders.

33. A synchronous machine as defined in claim 30, wherein said free spaces are differently inclined relative to an axis of said machine, said holders being mirror-symmetrical relative to their longitudinal axis, shortened and inserted in said differently inclined free spaces, said tongues being formed to correspond to different inclinations of said free spaces.

34. A synchronous machine as defined in claim 18; and further comprising a toothed ring having a tooth which engages in a center of said holders in a receptacle and subdivides said receptacle into two partial receptacles for two said permanent magnets per each of said free spaces.

35. A synchronous machine as defined in claim 17; and further comprising a toothed ring having a tooth which engages in a center of said holder in a receptacle and subdivides said receptacle into two partial receptacles for two said permanent magnets per each of said free spaces.

36. A synchronous machine as defined in claim 35, wherein said holders receive two said permanent magnets which abut against side legs of said holders and cover at least a half cross-section of a receptacle of said holders; and further comprising means for filling an intermediate space between said two permanent magnets.

37. A synchronous machine as defined in claim 35, wherein said means for filling is an elastic mass.

38. A synchronous machine as defined in claim 17, wherein said U-shaped holders per each free space are welded to a tooth of a tooth ring and have side legs with an inclination corresponding to a shape of a transition from one of said pole plates to one of said claw poles.

\* \* \* \* \*